(12) United States Patent
Wilhelmsson et al.

(10) Patent No.: US 8,184,580 B2
(45) Date of Patent: May 22, 2012

(54) DATA PACKET COMMUNICATION SCHEDULING IN A COMMUNICATION SYSTEM

(75) Inventors: Leif Wilhelmsson, Dalby (SE); Bengt Lindoff, Bjärred (SE); Arild Lövendahl, Grimstad (NO)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 512 days.

(21) Appl. No.: 12/369,840

(22) Filed: Feb. 12, 2009

(65) Prior Publication Data
US 2010/0202416 A1   Aug. 12, 2010

(51) Int. Cl.
*H04W 4/00* (2009.01)
(52) U.S. Cl. .......................... 370/329; 370/321
(58) Field of Classification Search .................. 455/450, 455/41.2; 370/329
See application file for complete search history.

(56) References Cited

U.S. PATENT DOCUMENTS

| | | |
|---|---|---|
| 2004/0120306 A1 | 6/2004 | Wigard et al. |
| 2005/0249118 A1 | 11/2005 | Terry et al. |
| 2005/0271010 A1 | 12/2005 | Capretta |
| 2007/0025357 A1 | 2/2007 | Zhang et al. |
| 2007/0070961 A1 | 3/2007 | Tao |
| 2008/0043705 A1 | 2/2008 | Desai et al. |
| 2008/0200124 A1 | 8/2008 | Capretta et al. |
| 2008/0232315 A1* | 9/2008 | Bachl et al. .................. 370/329 |
| 2008/0233964 A1* | 9/2008 | McCoy et al. ................ 455/450 |
| 2009/0137206 A1* | 5/2009 | Sherman et al. ............. 455/41.2 |

FOREIGN PATENT DOCUMENTS

| | | |
|---|---|---|
| EP | 1 443 719 A1 | 8/2004 |
| WO | 2005/020518 A1 | 3/2005 |
| WO | 2006/080464 A1 | 8/2006 |

OTHER PUBLICATIONS

PCT International Search Report, mailed May 11, 2010, in connection with International Application No. PCT/EP2010/051710.
PCT Written Opinion, mailed May 11, 2010, in connection with International Application No. PCT/EP2010/051710.
International Preliminary Report on Patentability, mailed May 3, 2011, in connection with International Application No. PCT/EP2010/051710.

* cited by examiner

*Primary Examiner* — Kwang B Yao
*Assistant Examiner* — Syed M Bokhari
(74) *Attorney, Agent, or Firm* — Potomac Patent Group PLLC (57) ABSTRACT

A communication device has a plurality of concurrently operating transceiver systems, each operating in a respectively different one of a plurality of communication systems. Operation of the transceiver systems is coordinated by receiving a plurality of requests from different ones of the transceiver systems, each of the requests being a request to access a communication medium for the purpose of transmitting or receiving a data packet. Utilization of an available time period is scheduled by selecting which one or ones of the requests to grant based, at least in part, on how many remaining times out of a maximum number of times each of the transmission systems' data packet is permitted to be retransmitted compared to other requests, on whether the requests are requests to transmit a data packet, and on whether the requests are requests to receive a data packet.

19 Claims, 8 Drawing Sheets

DATA PACKET COMMUNICATION SCHEDULING IN A COMMUNICATION SYSTEM

BACKGROUND

The present invention relates to wireless telecommunication systems, and more particularly to methods and apparatuses that enable multiple radio systems to operate in the same or close radio spectra and/or located geographically near to each other.

When a few decades ago, spectrum regulations were changed to allow commercial radio applications in unlicensed bands, interest was marginal. But this interest has changed radically in the last few years. After the worldwide success of mobile telephony in licensed bands, capacity limitations and huge license fees have spurred the interest of radio applications in the unlicensed band. In the past few years, communications systems such as those operating in accordance with the Wireless Local Area Network (WLAN) IEEE 802.11 standards and the Bluetooth® standards have been increasingly deployed in the 2.4 GHz band. Moreover, new communications systems are being worked on, such as the Wireless Personal Area Network (WPAN) activity under IEEE 802.15.

Radio spectrum, even unlicensed, is limited. Despite this, ubiquitous communications using several different standards is foreseen in the near future. Coexistence is not trivial as different standards follow different protocols. Moreover, regulations, initially intended to provide fair sharing, are constantly changing to allow for higher data rates, yet moving away from robustness requirements. The use of an unlicensed band poses the challenge of coexistence. In the design phase of a new communication system that has to operate in the unlicensed band, the developer has to design units that will be expected to share the band with:
  Incumbent non-communications: Power unintentionally radiated by equipment, for example microwave ovens, will be a source of disturbance.
  Incumbent communications: Intended radiation by other communication systems like for example WLAN, Bluetooth®, or Radio Frequency-Identification (RF-ID) will also be experienced as disturbance when no coordination is applied.
  Future systems: Systems that do not exist yet but which will be built in the future can cause severe disturbances. The only known factors are the restrictions imposed upon these systems by the regulations. However, as discussed before, regulations are changing over time, making predictions rather unreliable.

Coexistence can be handled in a number of different ways, as will now be discussed.

Interference mitigation by applying direct-sequence spreading or forward-error-correction coding can be useful, but is usually insufficient due to the near-far problem. That is, in ad-hoc scenarios in particular, a jamming transmitter can come very close to a receiver. The power levels received can thus be sufficiently strong to bring the front-end of the receiver into saturation, which causes clipping. As a result of the clipping (which imposes non-linear effects) the effective gain decreases (desensitization) and intermodulation products arise.

Avoidance is another method of mitigating interference. Avoidance in time can be applied by listening-before-talk or Carrier Sense Multiple Access/Collision Avoidance (CSMA/CA) as applied in IEEE 802.11 and other standards. However, this renders suboptimal solutions because the collision measurements render absolute power levels whereas the Packet Error Rate (PER) depends on the Carrier-to-Interference (C/I) ratio.

Avoidance in frequency is provided by frequency agile techniques such as Dynamic Frequency Selection (DFS). In this method, the system measures where in the frequency band other transmitters are active, and subsequently avoids these frequency segments. This is fine when potential jammers broadcast their presence continuously, for example on a control channel. However, measuring on bursty data channels results in unreliable measurements. Hopping provides better mitigation methods based on frequency avoidance. Because of the large isolation between the intended signal and the jammer when the hopper and jammer do not coincide, rather good robustness can be obtained. However, frequency hopping only works when the jammers are narrowband; likewise, time hopping only works when jammers have a low duty cycle. Incumbent systems in the unlicensed bands usually are bandwidth restricted but are rarely duty cycle restricted, posing a problem for time hopping systems like Ultra-Wideband (UWB) Impulse Radio.

Arranging for the different systems to use different frequencies is another coexistence technique. However, when the different transceivers are located in the very same device or are otherwise very close to one another, practical problems relating to filtering out strong interference result in the use of different frequency bands being insufficient to avoid interference between the different systems unless those different frequency bands are sufficiently separated from one another.

More particularly, when the different systems are sufficiently separated in frequency, coexistence is typically ensured by means of filtering. In this way the systems can be treated independent of one another, as if the other systems were not at all present. In such cases, the performance of each system will be unaffected of operation of the other systems. The cost associated with this approach is the possibility of very hard requirements on the necessary filters. In addition, a filter also causes attenuation loss of the desired signal, known as the insertion loss. This results in degraded sensitivity for systems that employ such hard filtering.

When the different systems operate very close to one another in frequency, filtering is generally not a feasible solution, due to the very hard requirement on the attenuation required to ensure that the victim system will not be severely degraded.

Thus, often the only feasible way of coexistence is the use of time division, in which the systems are coordinated in time so that no two systems are active at the same time. One issue related to coexistence by means of time division is that some kind of collaboration between the systems usually is needed. For instance, if it is known by one system that another system is receiving, the former might delay its transmission not to interfere with the latter. Alternatively, the latter system might choose not to use the information received in case it knows the former is transmitting, and instead rely on that the information can be obtained anyway through powerful coding and time interleaving or possibly by retransmission mechanisms.

Coordination between the systems is, for example, the typical approach used when Bluetooth® and WLAN technology are co-located in the same device. A method known as Packet Traffic Arbitration (PTA) is used, and this results in one of the two standards being given priority over the other one. Priorities are typically based on the type of service that is being carried by the respective systems. For example, if one of the systems is carrying delay sensitive data (e.g., voice or streaming video) and the other is carrying data that is not delay sensitive (e.g., file download), higher priority is typically given to the delay sensitive service.

A problem with using coexistence solutions based on time division is that the systems that are given low priority might not work well. For instance, it might not be possible to guarantee the desired Quality of Service (QoS) of one system if there is another active system having a higher priority. Consider the situation in which the higher priority system has a lot of data to transmit: this can seriously hamper the performance of the lower priority system. Suppose two or more systems have relatively stringent delay constraints, with one of the systems having a higher priority than the others. Automatically favoring the higher priority system under these circumstances can result in the lower priority systems failing to work properly. This can happen, for example, as a result of the lower priority systems having excessively long delays between communication of traffic which results in lost connections due to timeouts. If the systems are used for relaying information, things might not work at all because the relaying function only works if all involved systems work properly.

Another problem with coexistence solutions is the poor utilization of the available spectrum. If only one system is used at a time, parts of the spectrum will always be unused for data transmission, and effectively used only as a guard band.

Today, the ISM band at 2.4-2.485 GHz is used both by Bluetooth® technology and by WLAN. Both of these incompatible technologies can be found in mobile phones, and the percentage of phones that will have both Bluetooth® and WLAN technology built into them will increase in the future. The bands used for the cellular standards, like the Global System for Mobile Communication (GSM) and Wideband Code Division Multiple Access (WCDMA) are today located several hundred MHz away from the ISM band, and ensuring co-existence between for instance Bluetooth® technology and the cellular standards has been easily achieved by means of filtering. However, with the introduction of technology built in accordance with the Worldwide Interoperability for Microwave Access (WiMAX) standard, which might be used in the 2.3 GHz band, filtering might not be sufficient to ensure co-existence. Also, with the International Mobile Telecommunications-2000 (IMT-2000) extension band located at 2.5-2.69 GHz, filtering alone will not suffice to ensure coexistence with standards using the 2.4 GHz ISM band. IMT-2000 technology (e.g., TD-SCDMA and E-UTRA TDD) will also use the 2.3 GHz band.

As these various communication devices become smaller, the number of transceivers in different devices like mobile phones, personal digital assistants (PDAs), laptop computers, and the like is increasing. This means that co-existence between different systems is an issue that can be expected to become even more pronounced in the future.

Therefore, it is desirable to have methods and apparatuses that enable various radio communication systems to coexist with one another in an efficient way.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that operate a communication device having a plurality of concurrently operating transceiver systems, each operating in a respectively different one of a plurality of communication systems. Such operation includes receiving a plurality of requests from different ones of the transceiver systems, each of the requests being a request to access a communication medium for the purpose of transmitting or receiving a data packet. Utilization of an available time period is scheduled by selecting which one or ones of the requests to grant based, at least in part, on how many remaining times out of a maximum number of times each of the transmission systems' data packet is permitted to be retransmitted, on whether the requests are requests to transmit a data packet, and on whether the requests are requests to receive a data packet.

In some embodiments, scheduling utilization of the available time period comprises granting only one of the requests if none of the requesting transceiver systems has been waiting longer than a threshold duration of time without access to the communication medium, wherein the granted request is a request to communicate a data packet having a fewest number of remaining permissible retransmission attempts compared to other requests. If one of the requesting transceiver systems has been waiting longer than the threshold duration of time without access to the communication medium and other ones of the requesting transceiver systems have a sufficient number of remaining retransmissions to communicate a data packet at a later time, then only one of the requests is granted, wherein the request grant is awarded to the requesting transceiver systems that has been waiting longer than the threshold duration of time without access to the communication medium.

In some embodiments, the threshold duration of time is sized to avoid a timeout of a requesting receiver system connection.

In some embodiments, scheduling utilization of the available time period comprises ascertaining whether two or more of the requests are requests to receive a data packet, and ascertaining whether a link quality associated with each of the two or more receive requests is sufficient to enable each of the two or more requesting transceiver systems to successfully receive a respective one of a number of data packets from a received signal that has been split among the requesting transceiver systems. The two or more receive requests are granted if the link quality associated with each of the two or more receive requests is sufficient to enable each of the two or more requesting transceiver systems to successfully receive the respective one of the number of data packets from a received signal that has been split among the two or more requesting transceiver systems.

In some embodiments, scheduling utilization of the available time period further includes denying one or more other requests that are requests to transmit a data packet.

In some embodiments, scheduling utilization of the available time period comprises ascertaining whether two or more of the requests are requests to transmit a data packet, and ascertaining whether a transmission power associated with each of the two or more transmit requests is sufficiently low to enable each of the requesting transceiver systems to concurrently transmit a respective one of a number of data packets without intermodulation affects exceeding a predetermined level of signal distortion or creating spurious signals outside a predefined frequency band. The two or more transmit requests are granted if the transmission power associated with each of the two or more transmit requests is sufficiently low to enable each of the two or more requesting transceiver systems to concurrently transmit a respective one of a number of data packets without intermodulation affects exceeding the predetermined level of signal distortion or creating spurious signals outside the predefined frequency band.

In some embodiments, scheduling utilization of the available time period further includes denying one or more other requests that are requests to receive a data packet.

In some embodiments, at least one of the transceiver systems operates in a frequency division duplex mode, and the requests comprise transmission requests and receiver requests. Scheduling utilization of the available time period then comprises ascertaining whether granting all transmission requests and all receiver requests concurrently would result in intermodulation effects that would detrimentally affect one or more receiver operations. All of the requests are granted if granting all transmission requests and all receiver requests concurrently would not result in intermodulation effects that would detrimentally affect one or more receiver operations. If granting all of the requests would result in intermodulation effects that would detrimentally affect one or more receiver operations, then all receiver requests are granted but fewer than all transmission requests are granted.

In alternative embodiments in which at least one of the transceiver systems operates in a frequency division duplex mode and the requests comprise transmission requests and receiver requests, scheduling utilization of the available time period comprises ascertaining whether granting all transmission requests and all receiver requests concurrently would result in intermodulation effects that would detrimentally affect one or more receiver operations. All of the requests are granted if granting all transmission requests and all receiver requests concurrently would not result in intermodulation effects that would detrimentally affect one or more receiver operations or if each of the one or more receivers whose operations would be detrimentally affected by intermodulation effects has a remaining number of permissible retransmission attempts that is at least a predetermined number of times. If granting all of the requests would result in intermodulation effects that would detrimentally affect one or more receiver operations and at least one of the one or more receivers whose operations would be detrimentally affected by intermodulation effects does not have a remaining number of permissible retransmission attempts that is at least the predetermined number of times, then all receiver requests are granted but fewer than all transmission requests are granted.

Some embodiments are realized in a communication device comprising a plurality of concurrently operable transceivers, and an apparatus for carrying out any of the above scheduling techniques.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action, or alternatively as "means for" performing a described function.

In many applications, an automatic repeat request (ARQ) strategy is used (possibly in conjunction with forward error correction coding) to ensure that a data packet is delivered correctly. Some mechanism, such as adding a Cyclic Redundancy Check (CRC) code to the data, is employed to allow the recipient to determine whether the received data (possibly after error correction has been applied) is error-free. The transmitter, therefore, sends a data packet and waits for a receive status report from the receiver. The receiver checks the received packet for correctness, and generates the receive status report. A receive status report indicating acknowledgement (ACK) means that the packet is considered to be correctly received. In case the receiver does not receive the packet correctly, it returns a receive status report indicating a negative acknowledgement (NACK) of the packet. The transmitter considers a NACK to be a request for re-transmission of the packet. The number of allowed retransmissions depends on the delay constraints of the particular service with which the data packet is associated. The tighter the delay constraint, the smaller the number of permitted retransmissions.

An aspect of embodiments consistent with the invention involves prioritizing different services based not only on their respective delay constraints, but also on how many permissible retransmissions remain. As a result of such a strategy, even a data packet associated with a service that does not have a hard delay constraint and that starts out with many permissible retransmissions might be given higher priority when almost all permitted retransmissions have been used and there remains only a short period of time before the data packet has to be flushed (i.e., discarded without having been successfully received by the intended recipient).

Such a scheduling strategy means that priorities between different services are not assigned in advance based solely on the type of service involved, but rather are assigned on an on-going (i.e., dynamic) basis and, to a significant amount, based on actual conditions (e.g., buffer status and number of retransmissions that remain for the different services being considered).

These and other aspects will now be described in greater detail.

To more easily appreciate various aspects of the invention and understand its merits, the description involves two specific known communication standards. However, it should be understood that this is not intended to limit the scope of the invention in any way. To the contrary, the described techniques can equally well be used in connection with other communication standards. Moreover, generalization to more than two standards is also possible.

To further facilitate an understanding of various inventive aspects, the description is made for the case in which only two transceivers (each operating within a different communication system) are co-located within the same device and potentially interfere with one another.

Figure 1:
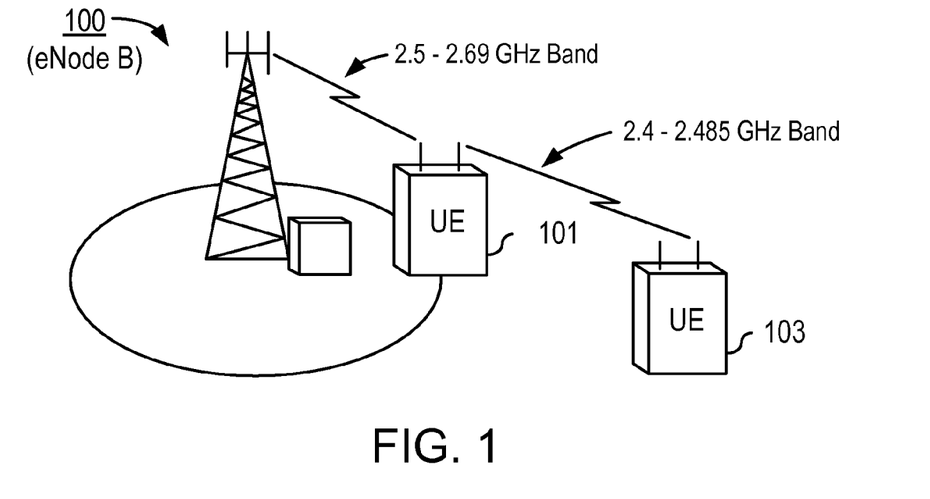
FIG. 1 is a block diagram illustrating coexistence problems that arise when a user equipment communicates with an eNode B of a cellular telecommunications system using one frequency band, and also communicates with a second user equipment using a second frequency band.

FIG. 1 is a block diagram of an eNode B (base station) 100 of a cellular telecommunications system. In this example, the air interface of the cellular communications system operates in accordance with LTE standards, and communications take place in the 2.5-2.69 GHz band. To illustrate coexistence situations, a first user equipment (UE) 101 is depicted that has first transceiver circuitry designed to operate in accordance with Bluetooth® standards, and these communications take place in the 2.4-2.485 GHz ISM band. As is well-known, Bluetooth® technology utilizes adaptive frequency hopping spread spectrum techniques, which avoid using crowded frequencies in the hopping sequence, thereby improving resistance to radio frequency interference. In the illustrated example, the first user equipment 101 is engaged in Bluetooth®-compatible communications with a second user equipment 103.

The first user equipment 101 also communicates with the eNode B 100. To enable these communications, the first user equipment 101 includes second transceiver circuitry designed to operate in accordance with any version/release of the LTE standard.

In the example illustrated in FIG. 1, the first transceiver's communications in the 2.4-2.485 GHz band are subject to interference from the second transceiver's operation in the 2.5-2.69 GHz band, and (at least in some operating modes) vice versa. The co-location of the first and second transceivers within the same device (e.g., the first user equipment 101) makes this especially problematic.

Figure 2:
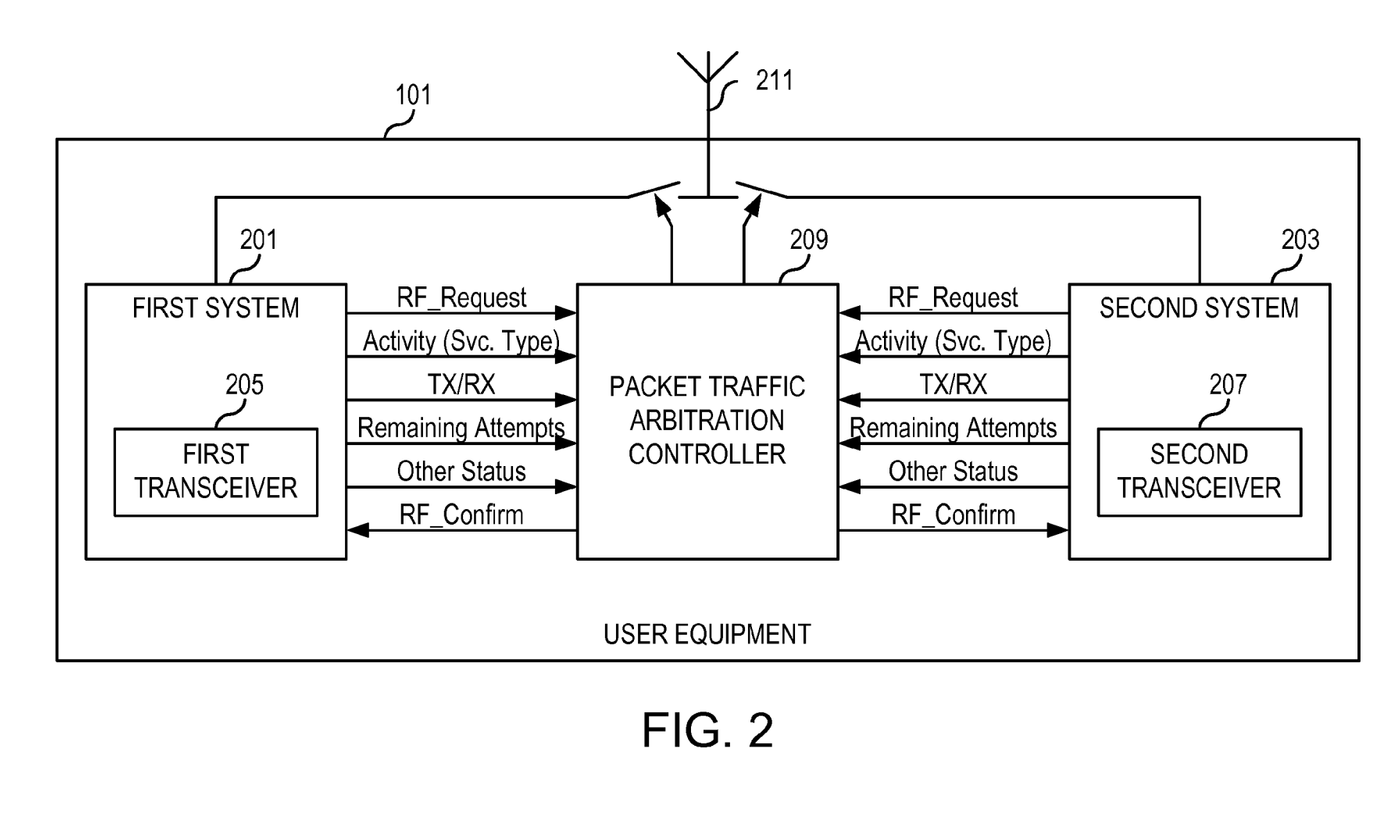
FIG. 2 is a block diagram of an exemplary user equipment adapted to carry out various aspects of the invention.

To address the problems illustrated in FIG. 1, the user equipment 101 comprises logic configured to operate the one or more transceivers housed within those devices to enable coexistence to occur. FIG. 2 is a block diagram of an exemplary user equipment 101 adapted to carry out various aspects of the invention. The user equipment 101 includes a first system 201 that operates in accordance with a first standard (e.g., Bluetooth®) in the 2.4-2.485 GHz ISM band, and a co-located second system 203 that operates in accordance with a second standard (e.g., LTE) in the 2.5-2.69 GHz band. The first system 201 includes a first transceiver 205, and the second system 203 includes a second transceiver 207. A packet traffic arbitration (PTA) controller 209 comprises circuitry configured to operate the first and second transceivers in a way that strives to achieve optimum performance of the first and second transceivers 201, 203 while enabling their operation to coexist with one another. Those having ordinary skill in the art will appreciate that in practice, a user equipment 101 includes other well-known circuitry (e.g., user interface circuitry, channel estimation circuitry, other processing circuitry, etc.) whose operation is unrelated to the present invention and that, for the sake of clarity, has been omitted from the figure.

In order to make decisions about which requests to grant, the PTA controller 209 receives a number of signals from each of the first and second transceivers 201, 203. These signals may include all or a subset of:
  a signal (RF_Request) whose assertion indicates that a request for access to the medium is being made;
  An Activity signal that indicates the type of service (e.g., delay sensitive, non-delay sensitive) being provided;
  an indicator (TX/RX) of whether the request is to transmit a data packet or to receive a data packet;
  an indicator of how many remaining attempts are permitted by the applicable standard to transmit/receive the data packet;
  other embodiment-dependent indicators, as described below.
In many (but not all) embodiments, the signals are not limited to those mentioned in the above list.

The PTA controller 209 signals its decision whether to grant or deny the request to each of the first and second transceivers 201, 203 by means of respective first and second decision signals (RF_Confirm). The PTA controller 209 also generates control signals that connect or disconnect the first and second transceivers 201, 203 from a shared antenna 207 in accordance with the decision. It will be appreciated that in alternative embodiments, the first and second transceivers 201, 203 can each be equipped with its own (i.e., non-shared) antenna.

In this exemplary embodiment, both the first and second systems 201, 203 transmit packets that are coded for error detection, for example by adding a CRC code to the data. Each of the first and second systems 201, 203 employs an ARQ scheme to enable retransmission of packets when earlier transmissions were not successful. In this exemplary embodiment, it is assumed that a simple stop-and-wait ARQ scheme is used for both the first and second systems 201, 203. However, those of ordinary skill in the art will readily be able to adapt the principles described herein to systems that employ other ARQ schemes, such as but not limited to go-back-n, or selective repeat ARQ strategies, each of which is well-known in the art. The various inventive principles are also applicable when only one of the systems makes use of retransmissions.

In a stop-and wait ARQ scheme, the packets to be transmitted are given sequence numbers (e.g., 0,1,2,3, . . . ). Once packet n has been transmitted, the transmitter waits for an acknowledgement from the receiver. If a positive acknowledgement (ACK) is received, then the next packet, n+1, can be transmitted. If the receiver does not receive the packet correctly, it does not send an ACK, but instead replies with a negative acknowledgement (NACK). In response to the NACK, the transmitter will resend packet number n. There is always a risk that the return packet carrying the receive status report (ACK or NACK) for a transmitted packet, n, will be lost, meaning that the transmitter does not know the receipt status. In the event of a lost receive status report, the transmitter typically assumes that the packet was not correctly received, and accordingly retransmits packet number n. Retransmission of a packet in response to the absence of a receive status report (ACK/NACK) is referred to as an "implicit NACK" (i.e., if the packet is not explicitly acknowledged, it is implicitly assumed to be lost). In case the packets are carrying data having a limited life-time (e.g., voice data), the packets must be delivered correctly within a certain time to be useful.

When processing data having a limited life-time, a timer is typically started when a packet is transmitted. As long as the timer has not expired, the packet is retransmitted if it still has not been positively acknowledged. However, if the packet has not been positively acknowledged by the time the timer expires, the data carried in the packet is outdated, and the packet is "flushed" (i.e., discarded) at the transmitter.

To illustrate with a numerical example, suppose that the first system 201 needs to complete the transmission of a packet within 10 ms of the first transmission attempt, and also that only one retransmission is permitted (which is a reasonable value in the context of voice communications). Furthermore, suppose that a packet might be transmitted every 5 ms, and that a receive status report (ACK/NACK) is received within 2 ms. This means that the first time a packet is transmitted by the first system 201, the timer is set to 10 ms and started. In case an ACK is received, the transmitter waits so that a new packet can be transmitted 10 ms after the first one was transmitted. In case a NACK is received (possibly implicit), the already-transmitted packet is retransmitted since the timer has not expired. (Since it is possible to transmit a packet every 5 ms, the timer will show that there are 5 ms left until the packet expires.) If an ACK is received for the retransmitted packet, communication was successful and the packet can be flushed. However, if a NACK is received (possibly implicit), the expiration of the timer prevents the packet from being again retransmitted. Instead, the packet is flushed in this case as well. Thus, regardless of whether an ACK or NACK was received, the next packet will be transmitted and the timer reset to 10 ms to start the process once again.

Next, suppose that the second system 203 has packets that can be transmitted once every 10 ms, and that the life-time of the packet is unlimited.

Given these examples, if one had to prioritize between the two systems, the first system 201 would be given priority due to the limited time within which a packet can be communicated before it is flushed.

Now, if the two systems are co-located in the same device as illustrated in FIG. 2, an arbiter (e.g., PTA controller 209) determines which one or ones of the systems should be allowed to be active in a given time period (e.g., time slot) in case both systems request access to the communication medium (i.e., to send or receive data). The arbiter then generates appropriate control signals to allow the permitted system(s) to perform the requested operation.

As mentioned earlier, arbitrating the medium access requests can be based simply on which of the requesting services has the most time-critical data, and awarding priority to that service. However, such a static arbitration algorithm can result in the remaining one or more services failing to work properly (e.g., by losing a connection as a result of a timeout for non-use), even though the data to be communicated by those services has not exceeded its useful lifetime. To address this problem, an aspect of embodiments consistent with the invention involves a dynamic arbitration algorithm that considers one or more present states of the services in addition to simply the type of service being provided. More particularly, when two or more requests to access the communication medium are made by respective two or more unrelated but co-located transceivers, utilization of an available time period is scheduled by selecting whether to grant only the first request, grant only the second request, or grant both the first and second requests based, at least in part, on how many remaining times out of a maximum number of times each of the service data packets is permitted to be retransmitted, on whether all of the medium access requests are requests to transmit, and on whether all of the medium access requests are requests to receive. This dynamic scheduling approach can still primarily award primary to the most time-critical services, while additionally taking steps to ensure that lower priority services are not detrimentally affected.

Many alternative embodiments can be devised based on this principle. A number of these will now be described in the context of a single embodiment that combines all of them. It will be readily appreciated by those of ordinary skill in the art, however, that any one of the features described below can be employed alone, or alternatively in any combination with any number of the other features.

Figure 3:
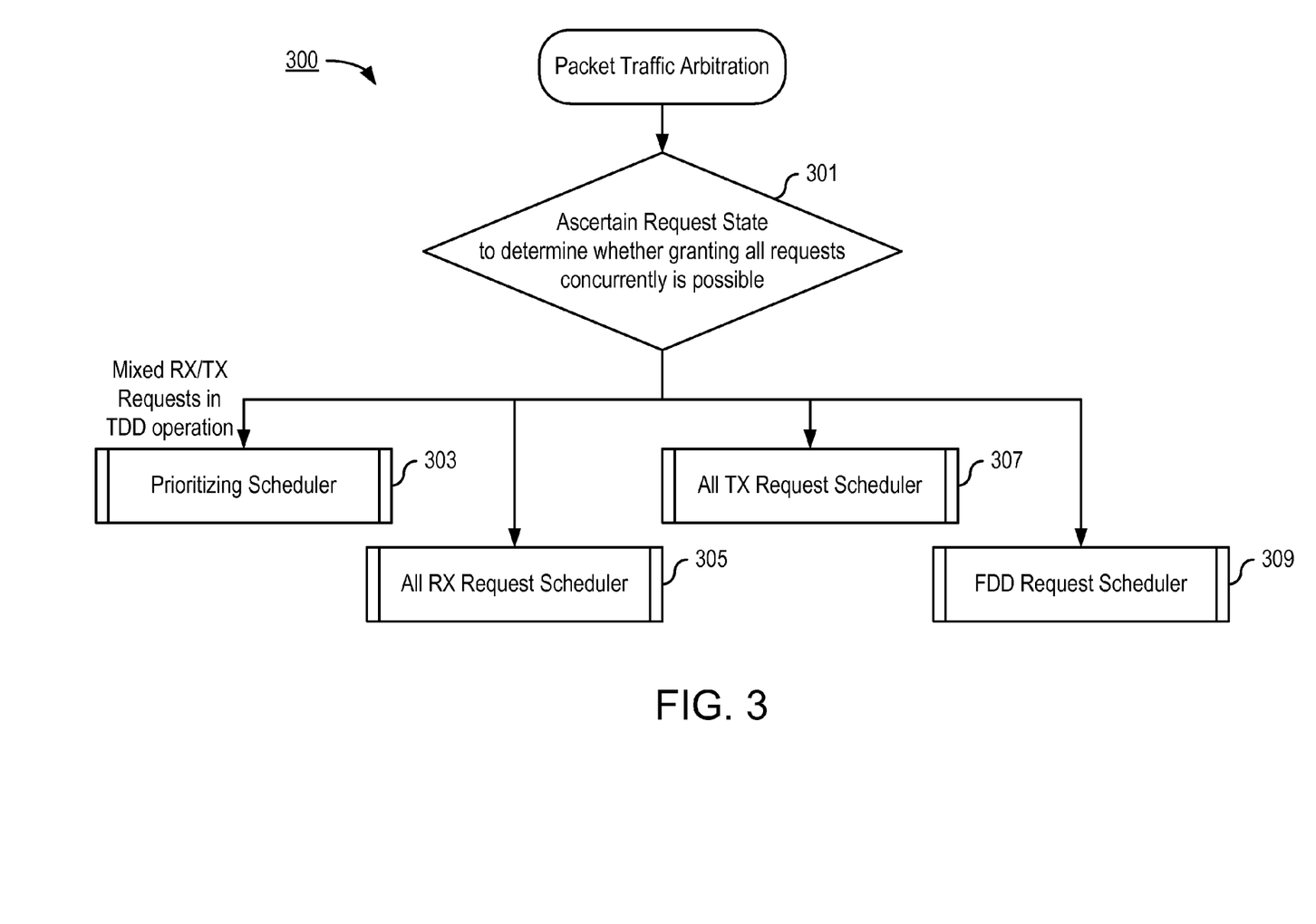
FIG. 3 is, in one respect, a flow diagram of exemplary steps/processes carried out by a user equipment in accordance with aspects of the invention in an exemplary embodiment.

FIG. 3 is, in one respect, a flow diagram of exemplary steps/processes carried out by a user equipment (e.g., by the PTA controller 209 in the user equipment 101) in accordance with aspects of the invention in an exemplary embodiment. FIG. 3 can also be considered to depict an exemplary user equipment 300 comprising various circuitry configured to carry out the functions described herein.

The inventors have recognized that when multiple requests (either for transmission—"TX"—or reception—"RX"—) are presented to a PTA controller, it is advantageous to determine whether the requests can all be granted without detrimentally affecting the performance of any one requester and, if not, to prioritize the requests based at least in part on how many remaining times out of a maximum number of times each of the requesters' respective data packets are permitted to be retransmitted. This enables the PTA controller to achieve a healthy balance between the need to attend to time-critical data and the need to prevent other users from experiencing detrimental effects (e.g., loss of connection) do to prolonged inactivity.

In the exemplary embodiment illustrated in FIG. 3, the user equipment ascertains whether there exists any of a number of request states under which all requests can be granted concurrently or whether prioritization of requests will be required (decision block 301). More specifically, in the exemplary embodiment the user equipment detects whether all requests are requests to perform a receive operation (step 305); whether all requests are requests to perform a transmit operation (step 307); or whether a mix of receive and transmit requests are presented in user equipment operating in a Frequency Division Duplex (FDD) mode (step 309). As will be seen in the more detailed discussion below, it may be (but will not necessarily be) possible to grant all requests concurrently under any of these circumstances. Those of ordinary skill in the art will recognize that other request states, not specified here, can exist under which it may be possible to grant all requests concurrently.

If, based on the request state, it is deemed not possible to grant all requests concurrently, then prioritization of requests is necessary. The user equipment therefore invokes a prioritizing scheduler (step 303).

The exemplary prioritizing scheduler bases decisions, at least in part, on how many remaining times out of a maximum number of times each of the requesters' respective data packets are permitted to be retransmitted. To see why this is helpful, consider a situation involving only two co-located systems, such as the user equipment 101 having first and second systems 201, 203 (see FIG. 2). Suppose both the first and second systems 201, 203 carry information having real-time requirements, wherein the first system 201 has more stringent requirements that allow for a maximum of two retransmissions, whereas the second system 203 allows for up to three retransmissions. In an aspect of embodiments consistent with the invention, the PTA controller takes into account the number of retransmissions that remain for the two systems, and gives priority to the system having the smallest number of remaining retransmissions. For example, if both the first and second systems 201, 203 are requesting access to the communication medium and each has data that is to be transmitted for the first time, the first system's request is given higher priority than that of the second system (i.e., the first system's request will be granted, and the second system's request will be held off). However, if the first system 201 is requesting access to the communication medium and it is the first attempt to transmit a certain packet, whereas the second system 203 is requesting access to the medium for the last attempt of transmitting a certain packet before the packet needs to be flushed, higher priority is given to the second system 203.

In some but not necessarily all embodiments, the strategy of considering time-sensitivity of data along with the number of remaining permissible retransmission attempts is further enhanced by considering whether any system connections are close to timing out. To illustrate this, again consider a situation involving only two co-located systems, such as the user equipment 101 having first and second systems 201, 203 (see FIG. 2). Suppose that the first system 201 has real-time requirements that only allow one re-transmission, whereas the second system 203 is being used for a file down/up-load. The second system 203 essentially does not have any real-time requirements on packet down or up load, and could, in theory, have a limitless number of permitted retransmission attempts. This, by itself, would suggest that whenever both systems request access to the communication medium, the PTA controller should favor the first system 201 over the second system 203.

However, as explained earlier, this can result in the second system failing to communicate for so long that its connection fails due to a timeout. To make this less likely, the prioritization strategy employed in this embodiment considers each system's time-sensitivity, but in addition considers whether the first system 201 is about to transmit a new packet, or whether it is a retransmission. The prioritization strategy also takes into account how long it has been since the second system 203 was last granted access to the communication medium. If the first system 201 is transmitting a new packet and the second system 203 has not been granted access for a relatively long time, then the second system 203 is given higher priority. In this way, the first system 201 will still have a relatively good chance of communicating the packet by means of its retransmission attempt, and the probability that the second system's link will be detached (i.e., due to excessively long inactivity) is reduced.

Figure 4:
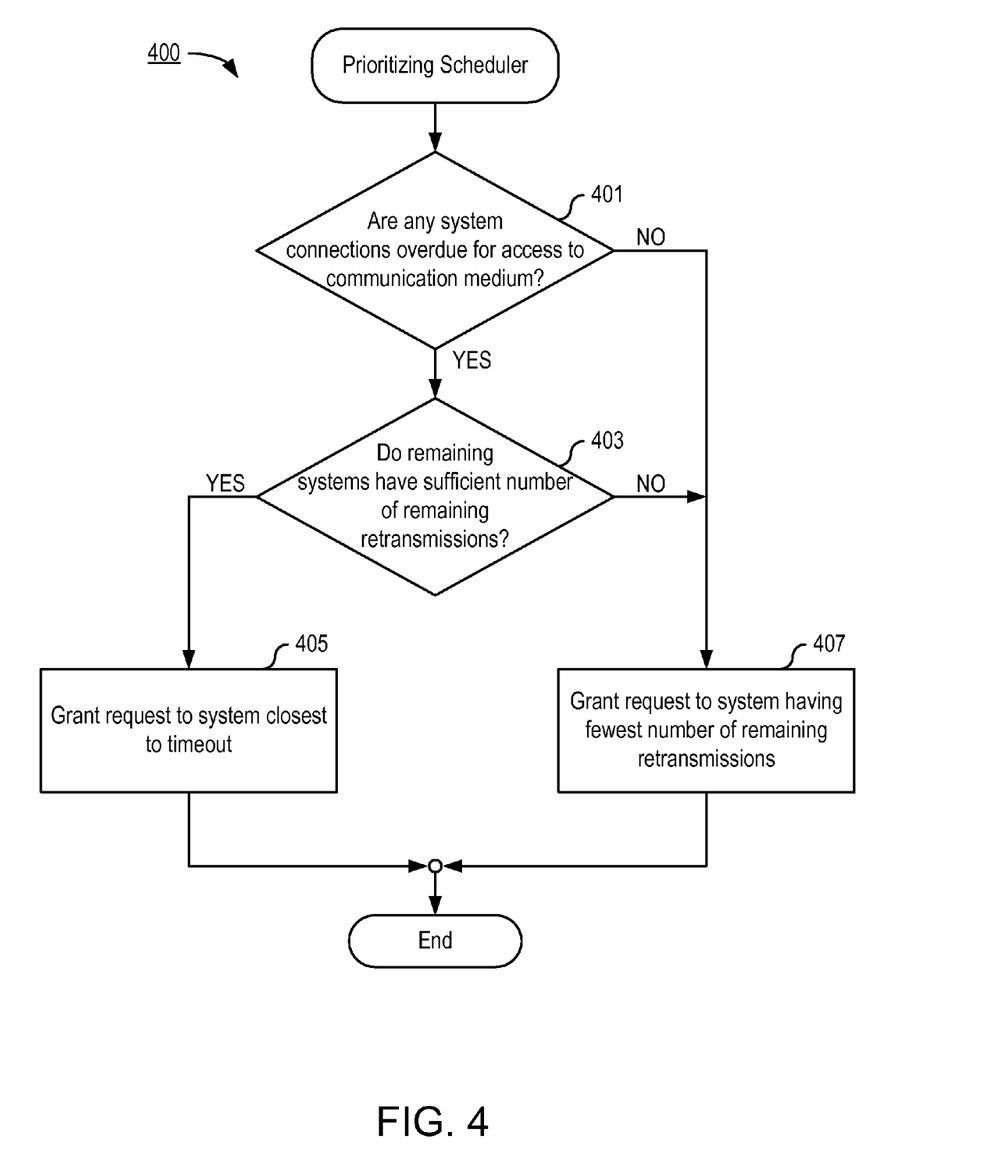
FIG. 4 is, in one respect, a flow diagram of exemplary steps/processes carried out by a user equipment in accordance with aspects of the invention in an exemplary embodiment of a prioritizing scheduler that considers how many remaining retransmission attempts each requesting transceiver system has as well as whether any of the requesting transceiver systems is close to a timeout.

FIG. 4 is, in one respect, a flow diagram of exemplary steps/processes carried out by a user equipment (e.g., by the PTA controller 209 in the user equipment 101) in accordance with aspects of the invention in an exemplary embodiment of a prioritizing scheduler that combines both the first and second aspects described above. FIG. 4 can also be considered to depict an exemplary user equipment 400 comprising various circuitry configured to carry out the prioritizing scheduler functions described herein. Making a prioritization decision begins by ascertaining whether any system connections are overdue for access to the communication medium (e.g., to determine whether there exist any connections that are close to a timeout) (decision block 401). This test can be made, for example, by comparing a connection's duration of time without access to the communication medium with a threshold value that has been set to avoid timeouts for that connection. If no system connections are overdue for access to the communication medium ("NO" path out of decision block 401), then access to the communication medium is awarded to the system having the fewest number of remaining retransmissions (step 407).

If at least one of the systems is overdue for access to the communication medium (e.g., close to a timeout) ("YES" path out of decision block 401), then making a prioritization decision further involves ascertaining whether the remaining systems (i.e., the systems other than the system that is close to a timeout) have a sufficient number of remaining retransmissions to forego access to the communication medium this time (decision block 403). It will be appreciated that what constitutes a "sufficient" number of remaining retransmissions is application-dependent, and can best be ascertained by the system designer. In some alternative embodiments, "sufficient" can even be "zero", meaning that timeout is always given priority over retransmission, since losing a link is typically worse than losing a packet. In such embodiments, decision block 403 can be removed entirely, and the flow from the "YES" path out of decision block 401 is directly to block 405.

Returning now to a discussion of the embodiment depicted in FIG. 4, if it is ascertained that one or more of the remaining systems do not have a sufficient number of remaining transmissions to forego access to the communication medium ("NO" path out of decision block 403), then access to the communication medium is awarded to the system having the fewest number of remaining retransmissions (step 407).

However, if it is ascertained that the one or more remaining systems do have a sufficient number of remaining transmissions to forego access to the communication medium ("YES" path out of decision block 403), then access to the communication medium is awarded to the system that is closest to timeout, in order to prevent this from happening.

The discussion will now focus on possibilities for granting simultaneous communication medium access to all of the requesters. The inventors have recognized that even if one system (or more) has time-critical data to deliver/receive whereas the other(s) does not, it may be possible to simultaneously grant all medium access requests if all requests are to perform a transmit operation, or alternatively if all requests are to perform a receive operation. In some embodiments, simultaneous access is awarded whenever all of the request types are homogeneous (i.e., all requests are requests to perform receive operations, or alternatively all requests are requests to perform transmission). Alternatively, simultaneous access can be scheduled to occur only at sufficient intervals to enable the systems communicating non-time-critical data to obtain enough access to the communication medium to avoid lost connections and the like.

Considering first the case of all requests being requests to access the communication medium for the purpose of receiving a data packet, this can be enhanced by taking channel conditions of the several requesting systems into account. Taking again the example of only two co-located systems, such as the user equipment 101 having first and second systems 201, 203 (see FIG. 2), it can be seen that the same antenna 211 is shared by the two systems. If a signal splitter (not shown) is used to split the received signal between the two systems, the overall noise figure for the two systems might be somewhat increased. With knowledge of the link quality of the two systems, the PTA controller 209 might then allow both the first and second systems 201, 203 to receive the signal if there is sufficient margin in their respective receivers, whereas the PTA controller 209 might allow only one system to receive in case at least one of the systems has a small link margin.

Figure 5:
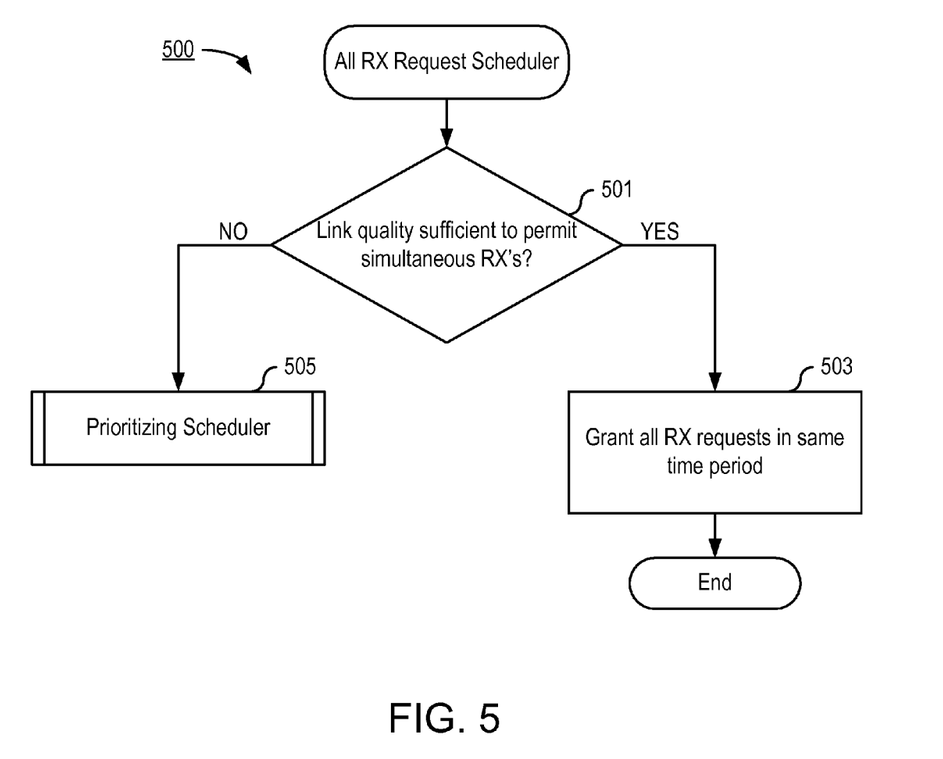
FIG. 5 is, in one respect, a flow diagram of exemplary steps/processes carried out by a user equipment in accordance with aspects of the invention in an exemplary embodiment of a prioritizing scheduler that grants all requests under certain circumstances when all requests are requests to perform receive operations.

FIG. 5 is, in one respect, a flow diagram of exemplary steps/processes carried out by a user equipment (e.g., by the PTA controller 209 in the user equipment 101) in accordance with aspects of the invention in an exemplary embodiment of a prioritizing scheduler that grants all requests under certain circumstances when all requests are requests to perform receive operations. FIG. 5 can also be considered to depict an exemplary user equipment 500 comprising various circuitry configured to carry out the "all receive" scheduler functions described herein. Making a prioritization decision begins by ascertaining whether the link quality is sufficient to permit simultaneous receive operations by all receivers (decision block 501). If it is ("YES" path out of decision block 501), then all concurrent requesters are awarded access to the communication medium (step 503).

However, if the link quality is not sufficient to permit simultaneous receive operations by all receivers ("NO" path out of decision block 501), then the requests are prioritized (step 505), such as by performing the prioritization strategy exemplified by FIG. 4.

Considering now the case of all requests being requests to access the communication medium for the purpose of transmitting a data packet, this can be enhanced by taking transmit powers of the several requesting systems into account. Taking again the example of only two co-located systems, such as the user equipment 101 having first and second systems 201, 203 (see FIG. 2), if both systems are transmitting at low output power such that the systems will not disturb each other (for instance by means of intermodulation distortion), both systems are allowed to transmit. However, if this condition is not fulfilled, and the transmitted signals are expected to be too distorted, the arbiter prioritizes the requests of the two systems. In some, but not necessarily all, embodiments, another factor that the arbiter considers is whether intermodulation distortion between the two systems will cause spurious emissions, which cause the equipment to fail to comply with the standardization and/or other regulatory requirements. If such a condition would exist, the arbiter does not grant all requests, but instead prioritizes between them, allowing only one of the systems to transmit.

Figure 6:
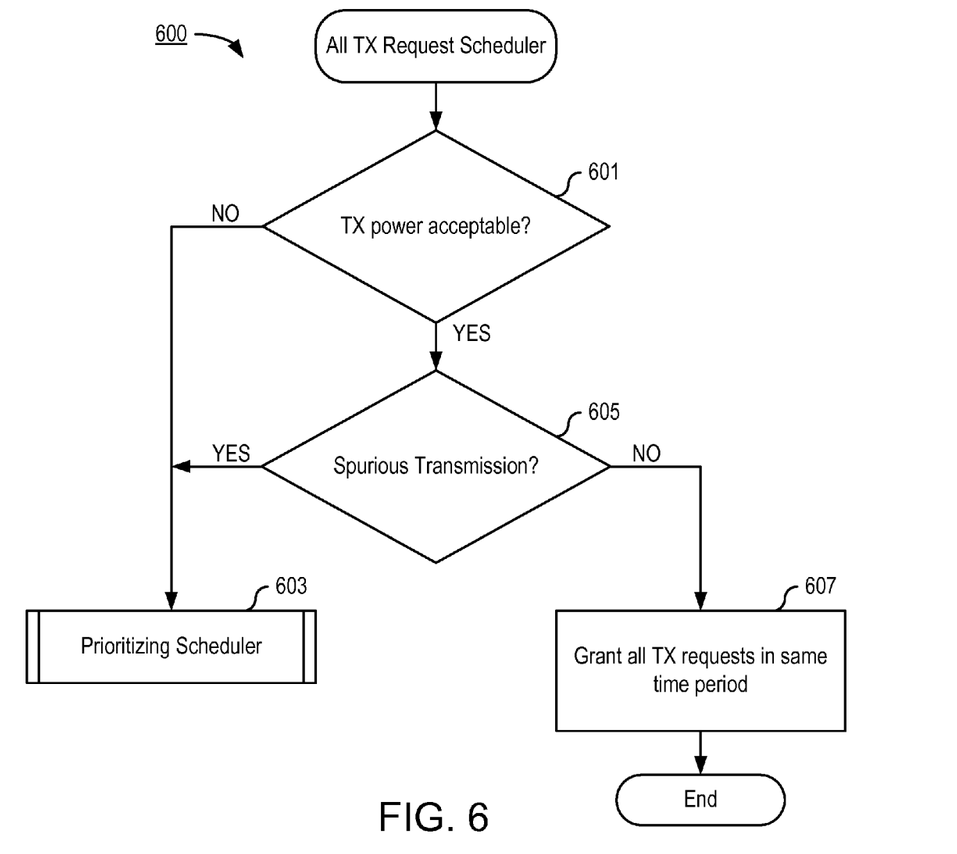
FIG. 6 is, in one respect, a flow diagram of exemplary steps/processes carried out by a user equipment in accordance with aspects of the invention in an exemplary embodiment of a prioritizing scheduler that grants all requests under certain circumstances when all requests are requests to perform transmit operations.

FIG. 6 is, in one respect, a flow diagram of exemplary steps/processes carried out by a user equipment (e.g., by the PTA controller 209 in the user equipment 101) in accordance with aspects of the invention in an exemplary embodiment of a prioritizing scheduler that grants all requests under certain circumstances when all requests are requests to perform transmit operations. FIG. 6 can also be considered to depict an exemplary user equipment 600 comprising various circuitry configured to carry out the "all transmit" scheduler functions described herein. Making a prioritization decision begins by ascertaining whether the transmission power of each of the requesting systems is sufficiently low to avoid unacceptable intermodulation affects such as distortion (decision block 601). If not ("NO" path out of decision block 601), only one of the transmission requests will be granted. The user equipment therefore invokes a prioritizing scheduler to decide which request to grant (step 603). The prioritizing scheduler can be, for example, one such as that illustrated by FIG. 4.

If the transmission power levels are acceptable to allow concurrent transmission without experiencing unacceptable distortion from, for example, intermodulation effects ("YES" path out of decision block 601), the user equipment further ascertains whether concurrent transmission would result in spurious transmissions outside of an allowed frequency band (decision block 605). If it would ("YES" path out of decision block 605), only one of the transmission requests will be granted. The user equipment therefore invokes a prioritizing scheduler to decide which request to grant (step 603). The prioritizing scheduler can be, for example, one such as that illustrated by FIG. 4.

However, if spurious transmissions would not result from concurrent transmissions ("NO" path out of decision block 605), then the user equipment grants all of the transmission requests for access to the communication medium during a same time period (step 607).

Considering now the case the requests being a mix of transmit and receive requests but this time as part of the user equipment's FDD operation, the inventors have recognized that there are circumstances in which these can all be granted simultaneously. In particular, the strategy involves considering the different intermodulation effects that would result if all request are granted. Taking again the example of only two co-located systems, such as the user equipment 101 having first and second systems 201, 203 (see FIG. 2), suppose the first system 201 uses the frequency $f_a$ for uplink transmissions and the frequency $f_c$ for downlink communications, while the second system 203 uses the frequency $f_b$ for uplink transmissions and the frequency $f_d$ for downlink communications. Then, depending on the relationship between the four frequencies $f_a, f_b, f_c,$ and $f_d$, when transmission occur on both $f_a$ and $f_c$ simultaneously, intermodulation products (e.g., due to non-linearities in the transmitter) could fall into $f_b$ and/or $f_d$. Then if, for example, the second system's reception is disturbed by intermodulation effects resulting from simultaneous transmissions by the first and second systems 201, 203, the scheduler allows for transmission for both systems only as long as the affected one or more receivers have a sufficient number of remaining retransmission attempts to enable them to obtain the data that is expected to be lost during the time period when both transmitters are operating. However, once a critical number of retransmissions is reached (the exact number being an application-specific parameter), the scheduler stops the transmission on the first and/or or second systems 201, 203 to enable reception to occur unimpeded. The selection of which transmitter to stop is made as a function of quality of service requirements, and the like.

Figure 7A:
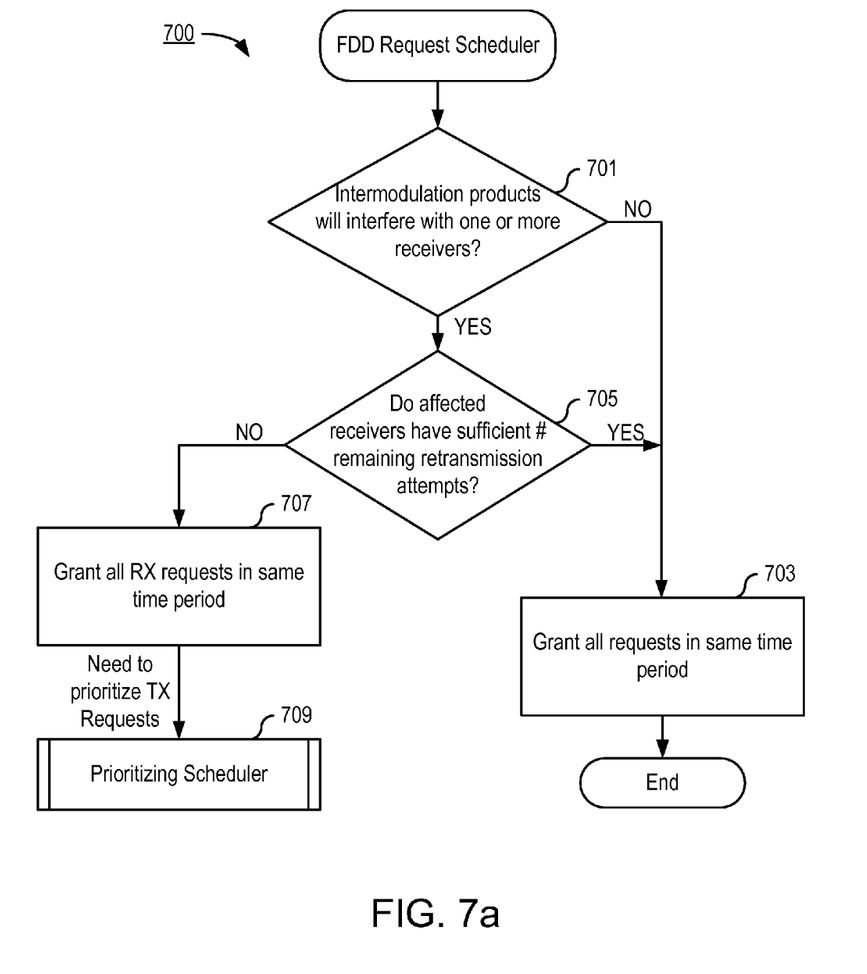
FIG. 7a is, in one respect, a flow diagram of exemplary steps/processes carried out by a user equipment in accordance with aspects of the invention in an exemplary embodiment of a prioritizing scheduler that grants all receive and transmit requests in a Frequency Division Duplex (FDD) environment under certain circumstances.

FIG. 7a is, in one respect, a flow diagram of exemplary steps/processes carried out by a user equipment (e.g., by the PTA controller 209 in the user equipment 101) in accordance with aspects of the invention in an exemplary embodiment of a prioritizing scheduler that grants all receive and transmit requests in an FDD environment under certain circumstances. FIG. 7a can also be considered to depict an exemplary user equipment 700 comprising various circuitry configured to carry out the "FDD request scheduler" functions described herein. Making a prioritization decision begins by ascertaining whether the intermodulation products resulting from simultaneous operation of all systems' transmitters will interfere with any of the receivers' operations (decision block 701). If not ("NO" path out of decision block 701), all pending requests (both transmit and receive) are granted and allocated to occur during a same given time period (step 703).

If it is anticipated that concurrent operation of two or more transmitters will cause intermodulation products that interfere with one or more receivers ("YES" path out of decision block 701), the affected receivers' systems are analyzed to determine whether each has a sufficient number of remaining permitted retransmission attempts to enable reception at a later time of what will likely be a lost data packet during the time period that concurrent transmission will take place (decision block 705). If so ("YES" path out of decision block 705), then all pending requests (both transmit and receive) are granted and allocated to occur in a same given time period (step 703).

However, if one or more of the receivers has an insufficient number of remaining requests to be able to rely on a later attempt to receive the data packet ("NO" path out of decision block 705), then steps are taken to protect reception. Specifically, all of the pending reception requests are granted to occur in the given time period (step 707) and one or more of the transmitters whose operation contributes to the interfering intermodulation product is denied access to the communication medium during the given time period. In order to choose which of the transmitters will be permitted to operate during the given time period, a prioritizing scheduler is invoked (step 709). The prioritizing scheduler may, for example, be an embodiment such as the one depicted in FIG. 4.

One characteristic of the embodiment depicted in FIG. 7a is its reliance on the user equipment knowing how many remaining retransmissions may be attempted for each receive operation. However, in some embodiments this information may not be known reliably. For example, in systems in which a transmitted data packet may be intended for any one of a number of possible receivers (the intended recipient being indicated, for example, by means of a recipient address that is communicated with the packet), it is possible that poor reception conditions caused a receiver to fail to detect that it was the intended recipient of a packet. Under these circumstances, the transmitter of the lost packet will have reduced the number of remaining permitted retransmissions by 1, but the recipient, being unaware that a transmission attempt had been made, will not.

Figure 7B:
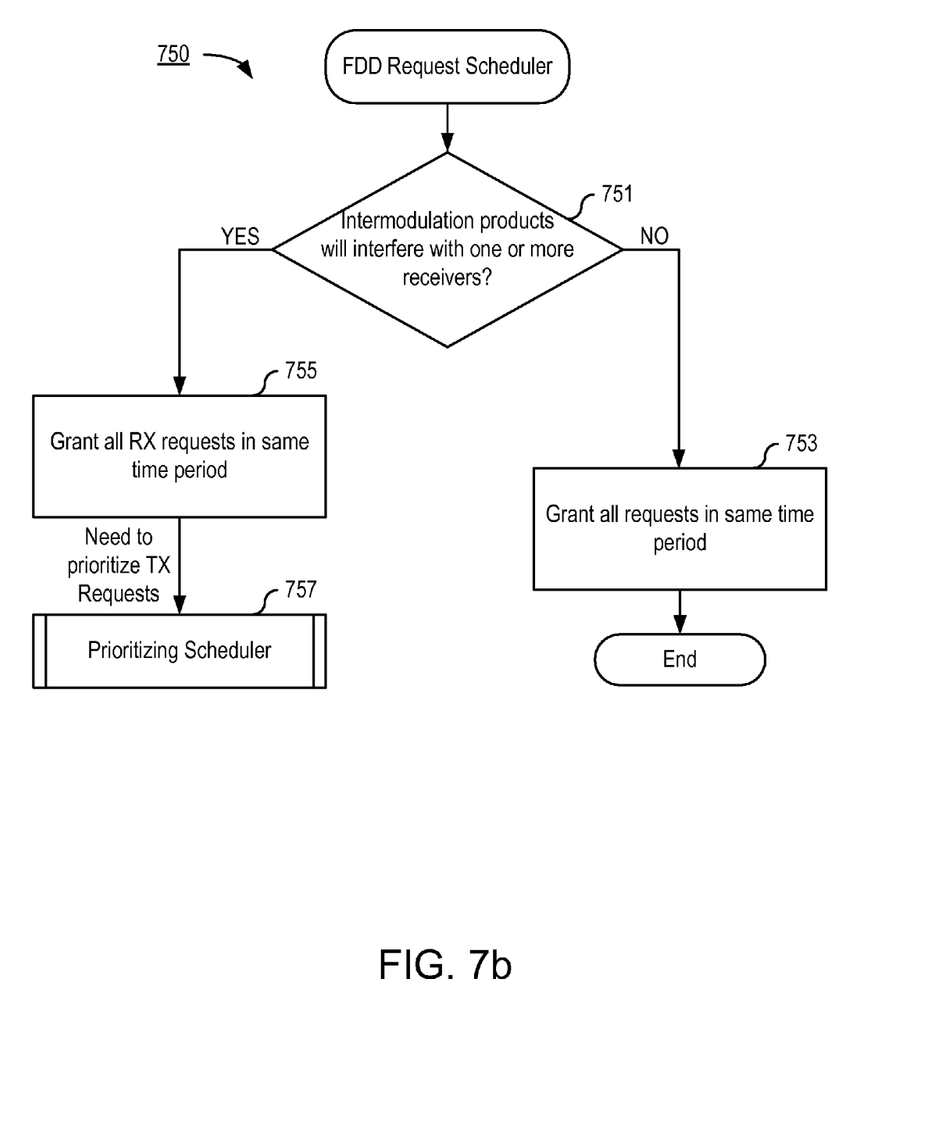
FIG. 7b is, in one respect, a flow diagram of exemplary steps/processes carried out by a user equipment in accordance with aspects of the invention in an alternative exemplary embodiment of a prioritizing scheduler that grants all receive and transmit requests in an FDD environment under certain circumstances.

Therefore, alternative embodiments of the FDD request scheduler are useful in environments in which the number of remaining retransmission attempts is not reliably known by the receiver. (It will be appreciated that the transmitter always has an accurate count of how many remaining retransmission attempts may be made, since it is the one performing the transmission.) Specifically, FIG. 7b is, in one respect, a flow diagram of exemplary steps/processes carried out by a user equipment (e.g., by the PTA controller 209 in the user equipment 101) in accordance with aspects of the invention in an alternative exemplary embodiment of a prioritizing scheduler that grants all receive and transmit requests in an FDD environment under certain circumstances. FIG. 7b can also be considered to depict an exemplary user equipment 750 comprising various circuitry configured to carry out the "FDD request scheduler" functions described herein. Making a prioritization decision begins by ascertaining whether the intermodulation products resulting from simultaneous operation of all systems' transmitters will interfere with any of the receivers' operations (decision block 751). If not ("NO" path out of decision block 751), all pending requests (both transmit and receive) are granted and allocated to occur during a same given time period (step 753).

If it is anticipated that concurrent operation of two or more transmitters will cause intermodulation products that interfere with one or more receivers ("YES" path out of decision block 751), then steps are taken to protect reception, since it is unknown whether any of the affected receivers has a sufficient number of remaining retransmission attempts to receive the anticipated lost data at a later time. Specifically, all of the pending reception requests are granted to occur in the given time period (step 755) and one or more of the transmitters whose operation contributes to the interfering intermodulation product is denied access to the communication medium during the given time period. In order to choose which of the transmitters will be permitted to operate during the given time period, a prioritizing scheduler is invoked (step 757). The prioritizing scheduler may, for example, be an embodiment such as the one depicted in FIG. 4.

Having presented a number of exemplary embodiments intended to illustrate various inventive principles, a number of general comments can be made. One is that, in each embodiment, decisions are made dynamically (i.e., based on actually experienced conditions), so that scheduling is not set far in advance (i.e., it is not planned that one system's requests will always be awarded higher priority than those of another system).

Furthermore, the basic ideas described herein can be generalized to more than two systems. For example, in embodiments relating to FDD operation, the inventive principles can be adapted to additionally cover the case in which intermodulation products introduced when simultaneous transmissions by first and second systems interfere with a third system's reception and at least one of the first and second systems' transmissions is stopped if the third system's reception reaches an insufficient number of remaining permissible retransmission attempts.

The invention has been described with reference to particular embodiments. However, it will be readily apparent to those skilled in the art that it is possible to embody the invention in specific forms other than those of the embodiment described above.

For example, in situations involving more than two transceiver systems with two or more requesting to receive and one or more others requesting to transmit, a decision can be made, for example, to deny all of the transmit requests. This reduces the situation to one in which all remaining requests are requests to receive. These requests can then be resolved, for example, by following a procedure as discussed above with respect to FIG. 5. An alternative embodiment following a similar approach would deny only those transmit requests that can cause interference to any of the receive requests, but to allow any of those transmit requests that pose no interference risk.

In another example, in situations involving more than two transceiver systems with two or more requesting to transmit and one or more others requesting to receive, a decision can be made, for example, to deny all of the receive requests. This reduces the situation to one in which all remaining requests are requests to transmit. These requests can then be resolved, for example, by following a procedure as discussed above with respect to FIG. 6. An alternative embodiment following a similar approach would deny only those receive requests that would experience interference from any of the transmit requests, but to allow any of those receive requests that have no interference risk. Techniques such as those described above with respect to FIG. 5 can be used to determine whether several concurrent receive requests can be granted.

In yet another example, embodiments involving FDD operation have been described with reference to FIGS. 7a and 7b. In the exemplary embodiments, it was assumed that all transceiver systems utilize FDD operation. However, a similar situation can occur even if only one (or more) of the requesting transceiver systems is operating in FDD mode while one or more others are operating in a TDD mode. This is because concurrently granting all transmit requests (including those from the TDD systems) can cause intermodulation products that will interfere with one or more FDD receive operations. Accordingly, techniques such as those described above with reference to FIGS. 7a and 7b can also be applied when TDD and FDD systems are operating concurrently.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a communication device having a plurality of concurrently operating transceiver systems, each operating in a respectively different one of a plurality of communication systems, the method comprising: receiving a plurality of requests from different ones of the transceiver systems, each of the requests being a request to access a communication medium for the purpose of transmitting or receiving a data packet; and scheduling utilization of an available time period by selecting whether only one or more than one of the requests will be granted and selecting which one or ones of the requests to grant, said selections being based at least on how many remaining times out of a maximum number of times each of the transmission systems' data packet is permitted to be retransmitted, and on whether the requests are requests to transmit a data packet, and on whether the requests are requests to receive a data packet.

2. The method of claim 1, wherein scheduling utilization of the available time period comprises:
granting only one of the requests if none of the requesting transceiver systems has been waiting longer than a threshold duration of time without access to the communication medium, wherein the granted request is a request to communicate a data packet having a fewest number of remaining permissible retransmission attempts compared to other requests; and
granting only one of the requests if one of the requesting transceiver systems has been waiting longer than the threshold duration of time without access to the communication medium and other ones of the requesting transceiver systems have a sufficient number of remaining retransmissions to communicate a data packet at a later time, wherein the request grant is awarded to the requesting transceiver systems that has been waiting longer than the threshold duration of time without access to the communication medium.

3. The method of claim 2, wherein the threshold duration of time is sized to avoid a timeout of a requesting receiver system connection.

4. The method of claim 1, wherein scheduling utilization of the available time period comprises:
ascertaining whether two or more of the requests are requests to receive a data packet;
ascertaining whether a link quality associated with each of the two or more receive requests is sufficient to enable each of the two or more requesting transceiver systems to successfully receive a respective one of a number of data packets from a received signal that has been split among the two or more requesting transceiver systems; and
granting the two or more receive requests if the link quality associated with each of the two or more receive requests is sufficient to enable each of the two or more requesting transceiver systems to successfully receive the respective one of the number of data packets from a received signal that has been split among the two or more requesting transceiver systems.

5. The method of claim 4, comprising:
denying one or more other requests that are requests to transmit a data packet.

6. The method of claim 1, wherein scheduling utilization of the available time period comprises:
ascertaining whether two or more of the requests are requests to transmit a data packet;
ascertaining whether a transmission power associated with each of the two or more transmit requests is sufficiently low to enable each of the two or more requesting transceiver systems to concurrently transmit a respective one of a number of data packets without intermodulation affects exceeding a predetermined level of signal distortion or creating spurious signals outside a predefined frequency band; and
granting the two or more transmit requests if the transmission power associated with each of the two or more transmit requests is sufficiently low to enable each of the two or more requesting transceiver systems to concurrently transmit a respective one of a number of data packets without intermodulation affects exceeding the predetermined level of signal distortion or creating spurious signals outside the predefined frequency band.

7. The method of claim 6, comprising:
denying one or more other requests that are requests to receive a data packet.

8. The method of claim 1, wherein:
at least one of the transceiver systems operates in a frequency division duplex mode;
the requests comprise transmission requests and receiver requests; and
scheduling utilization of the available time period comprises:
ascertaining whether granting all transmission requests and all receiver requests concurrently would result in intermodulation effects that would detrimentally affect one or more receiver operations;
granting all of the requests if granting all transmission requests and all receiver requests concurrently would not result in intermodulation effects that would detrimentally affect one or more receiver operations; and
if granting all of the requests would result in intermodulation effects that would detrimentally affect one or more receiver operations, then granting all receiver requests and granting fewer than all transmission requests.

9. The method of claim 1, wherein:
at least one of the transceiver systems operates in a frequency division duplex mode;
the requests comprise transmission requests and receiver requests; and
scheduling utilization of the available time period comprises:
ascertaining whether granting all transmission requests and all receiver requests concurrently would result in intermodulation effects that would detrimentally affect one or more receiver operations;
granting all of the requests if granting all transmission requests and all receiver requests concurrently would not result in intermodulation effects that would detrimentally affect one or more receiver operations;
if granting all of the requests would result in intermodulation effects that would detrimentally affect one or more receiver operations, then granting all transmission requests and all receiver requests concurrently only if each of the one or more receivers whose operations would be detrimentally affected by intermodulation effects has a remaining number of permissible retransmission attempts that is at least a predetermined number of times; and
if granting all of the requests would result in intermodulation effects that would detrimentally affect one or more receiver operations and at least one of the one or more receivers whose operations would be detrimentally affected by intermodulation effects does not have a remaining number of permissible retransmission attempts that is at least the predetermined number of times, then granting all receiver requests and granting fewer than all transmission requests.

10. An apparatus for controlling a communication device having a plurality of concurrently operating transceiver systems, each operating in a respectively different one of a plurality of communication systems, the apparatus comprising:
circuitry configured to receive a plurality of requests from different ones of the transceiver systems, each of the requests being a request to access a communication medium for the purpose of transmitting or receiving a data packet; and circuitry configured to schedule utilization of an available time period by selecting whether only one or more than one of the requests will be granted and selecting which one or ones of the requests to grant, said selections being based at least on how many remaining times out of a maximum number of times each of the transmission systems' data packet is permitted to be retransmitted, and on whether the requests are requests to transmit a data packet, and on whether the requests are requests to receive a data packet.

11. The apparatus of claim 10, wherein the circuitry configured to schedule utilization of the available time period comprises:
circuitry configured to grant only one of the requests if none of the requesting transceiver systems has been waiting longer than a threshold duration of time without access to the communication medium, wherein the granted request is a request to communicate a data packet having a fewest number of remaining permissible retransmission attempts compared to other requests; and
circuitry configured to grant only one of the requests if one of the requesting transceiver systems has been waiting longer than the threshold duration of time without access to the communication medium and other ones of the requesting transceiver systems have a sufficient number of remaining retransmissions to communicate a data packet at a later time, wherein the request grant is awarded to the requesting transceiver system that has been waiting longer than the threshold duration of time without access to the communication medium.

12. The apparatus of claim 11, wherein the threshold duration of time is sized to avoid a timeout of a requesting receiver system connection.

13. The apparatus of claim 10, wherein the circuitry configured to schedule utilization of the available time period comprises:
circuitry configured to ascertain whether two or more of the requests are requests to receive a data packet;
circuitry configured to ascertain whether a link quality associated with each of the two or more requests is sufficient to enable each of the two or more requesting transceiver systems to successfully receive a respective one of a number of data packets from a received signal that has been split among the two or more requesting transceiver systems; and
circuitry configured to grant the two or more receive requests if the link quality associated with each of the two or more receive requests is sufficient to enable each of the two or more requesting transceiver systems to successfully receive the respective one of the number of data packets from a received signal that has been split among the two or more requesting transceiver systems.

14. The apparatus of claim 13, comprising:
circuitry configured to deny one or more other requests that are requests to transmit a data packet.

15. The apparatus of claim 10, wherein the circuitry configured to schedule utilization of the available time period comprises:
circuitry configured to ascertain whether two or more of the requests are requests to transmit a data packet;
circuitry configured to ascertain whether a transmission power associated with each of the two or more transmit requests is sufficiently low to enable each of the two or more requesting transceiver systems to concurrently transmit a respective one of a number of data packets without intermodulation affects exceeding a predetermined level of signal distortion or creating spurious signals outside a predefined frequency band; and
circuitry configured to grant the two or more transmit requests if the transmission power associated with each of the two or more transmit requests is sufficiently low to enable each of the two or more requesting transceiver systems to concurrently transmit a respective one of a number of data packets without intermodulation affects exceeding the predetermined level of signal distortion or creating spurious signals outside the predefined frequency band.

16. The apparatus of claim 15, comprising:
circuitry configured to deny one or more other requests that are requests to receive a data packet.

17. The apparatus of claim 10, wherein:
at least one of the transceiver systems operates in a frequency division duplex mode;
the requests comprise transmission requests and receiver requests; and
the circuitry configured to schedule utilization of the available time period comprises:
circuitry configured to ascertain whether granting all transmission requests and all receiver requests concurrently would result in intermodulation effects that would detrimentally affect one or more receiver operations; and
circuitry configured to grant all of the requests if granting all transmission requests and all receiver requests concurrently would not result in intermodulation effects that would detrimentally affect one or more receiver operations; and circuitry configured to grant all receiver requests and granting fewer than all transmission requests if granting all transmission requests and all receiver requests concurrently would result in intermodulation effects that would detrimentally affect one or more receiver operations.

18. The apparatus of claim 10, wherein:

at least one of the transceiver systems operates in a frequency division duplex mode;

the requests comprise transmission requests and receiver requests; and the circuitry configured to schedule utilization of the available time period comprises:

circuitry configured to ascertain whether granting all transmission requests and all receiver requests concurrently would result in intermodulation effects that would detrimentally affect one or more receiver operations; and circuitry configured to grant all of the requests if granting all transmission requests and all receiver requests concurrently would not result in intermodulation effects that would detrimentally affect one or more receiver operations;

circuitry configured to grant all of the requests if it is ascertained that granting all transmission requests and all receiver requests concurrently would result in intermodulation effects that would detrimentally affect one or more receiver operations and each of the one or more receivers whose operations would be detrimentally affected by intermodulation effects has a remaining number of permissible retransmission attempts that is at least a predetermined number of times; and circuitry configured to grant all receiver requests and to grant fewer than all transmission requests if it is ascertained that granting all transmission requests and all receiver requests concurrently would result in intermodulation effects that would detrimentally affect one or more receiver operations and at least one of the one or more receivers whose operations would be detrimentally affected by intermodulation effects does not have a remaining number of permissible retransmission attempts that is at least the predetermined number of times.

19. A communication device comprising: a plurality of concurrently operable transceivers; and an apparatus for controlling the communication device having the plurality of concurrently operating transceiver systems, each operating in a respectively different one of a plurality of communication systems, the apparatus comprising: circuitry configured to receive a plurality of requests from different ones of the transceiver systems, each of the requests being a request to access a communication medium for the purpose of transmitting or receiving a data packet; and circuitry configured to schedule utilization of an available time period by selecting whether only one or more than one of the requests will be granted and selecting which one or ones of the requests to grant, said selections being based at least on how many remaining times out of a maximum number of times each of the transmission systems' data packet is permitted to be retransmitted, and on whether the requests are requests to transmit a data packet, and on whether the requests are requests to receive a data packet.

* * * * *